Jan. 29, 1924.
D. J. REEN
1,482,034
SANITARY CHICKEN PERCH
Filed Sept. 11, 1922
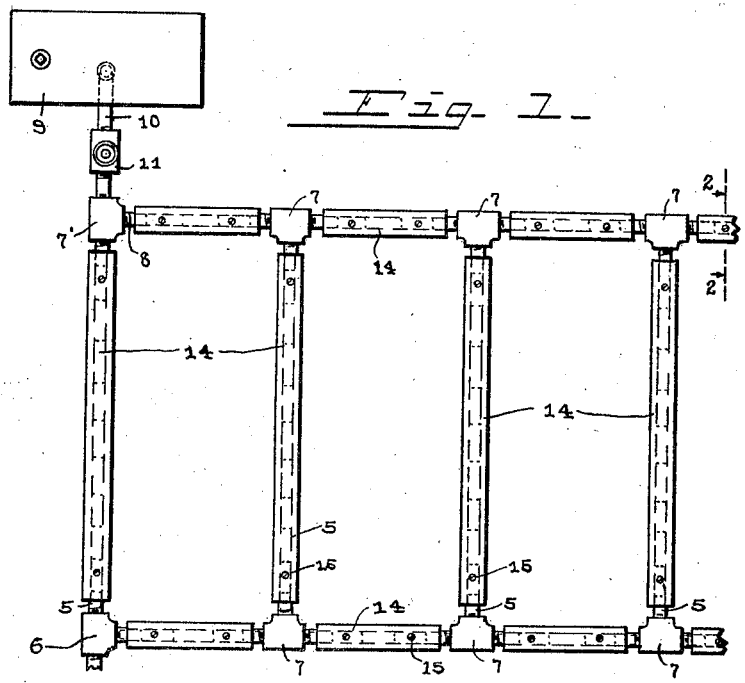
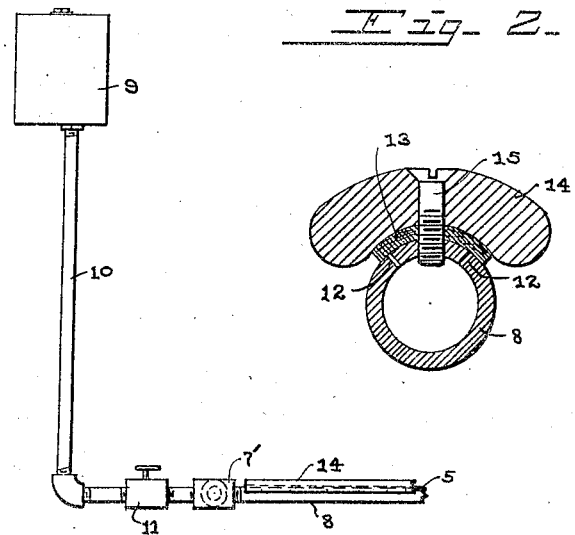
INVENTOR.
BY Daniel J. Reen
Morsell & Keeney
ATTORNEYS.

Patented Jan. 29, 1924.

1,482,034

UNITED STATES PATENT OFFICE.

DANIEL J. REEN, OF CLYMAN, WISCONSIN.

SANITARY CHICKEN PERCH.

Application filed September 11, 1922. Serial No. 587,500.

*To all whom it may concern:*

Be it known that I, DANIEL J. REEN, a citizen of the United States, and resident of Clyman, in the county of Dodge and State of Wisconsin, have invented new and useful Improvements in Sanitary Chicken Perches, of which the following is a description, reference being had to the accompanying drawings, which are a part of this specification.

This invention relates to sanitary chicken perches and has for its principal object to provide a perch for chickens and other similar fowls which is particularly adapted to prevent parasites such a mites, etc., from getting on the chickens while they are asleep on their perches.

Chickens are particularly subject to the attack of parasites at night while they are asleep, resulting in great discomfort to the chickens and tending to undermine their general condition. Parasites, however, leave the chickens before the latter leave their perches in the morning, and therefore it is difficult to deal with them. However, by employing the perch forming the subject matter of this invention, it is possible to successfully cope with the problem and substantially entirely prevent the parasites from getting onto the chickens.

With the above and other objects in view which will appear as the description proceeds, the invention consists in the novel details of construction and combinations of parts more fully hereinafter disclosed and particularly pointed out in the appended claims.

Referring to the accompanying drawing in which like numerals designate like parts in all the views;

Figure 1 is a diagrammatic plan view of a perch made in accordance with the present invention;

Fig. 2 is an enlarged cross sectional view taken on the plane indicated by the line 2—2 of Fig. 1, looking in the direction of the arrows; and, Fig. 3 is a fragmentary elevational view illustrating the connection of the perch with the tank for supplying the insecticide, as well as the valve for controlling the flow thereof.

In the said drawings the numeral 5 designates the perch proper which is preferably of tubular construction, being made up of sections of piping of suitable length, joined together by T-members 6 and 7. The said pipe sections 8 are all connected together, as will be readily apparent, and are adapted to be supplied with a suitable insecticide or other fluid such as kerosene, which will destroy or prevent the parasites from passing over surfaces covered with the said fluid.

The said insecticide or fluid may be supplied in any suitable manner, as for example from a tank 9 connected as by the pipe 10, controlled by the valve 11, to one of the T's 7', as will be clear from the drawings.

The pipe sections 8 are provided with suitable perforations 12, extending through their walls for permitting the insecticide carried within them to find its way to the exterior. The strips of felt or other suitable absorbent material 13 are positioned on the tops of the pipe sections 8, intermediate the T members 6 and 7 covering the perforations 12, as will be clear from Fig. 2. Perch members 14, preferably of wood, are placed over the said felt strips and secured to the pipes 8 by means of screws 15, thus forming suitable perches for the fowls to rest upon. As will be clear from Fig. 2 the said perch or foot rest members 14 are preferably arcuate in cross section and are of greater width than the absorbent strips 13, so that their edges overhang the said strips as well as the pipe sections 8, forming projections adapted to be engaged by toes of the fowls when resting thereon. The overhang also provides drip surfaces upon which any excess insecticide will collect and from which it will drip, as will be readily understood.

The manner of using the perch will be apparent from the foregoing but it might be said that it is only necessary to open the valve 11 for a comparatively short time until the pipes 8 are filled, whereupon the said valve may be closed. The kerosene or other insecticide employed will find its way from the interiors of the said pipes through the perforations 12 to the felt or other absorbent strips 13, which will become saturated and will cause the said insecticide to flow down over the outside surfaces of the pipes.

The insecticide will also, of course, be more or less absorbed by the wooden perch members 14, and all surfaces over which the parasites must travel to reach the chickens will therefore be covered with a thin film of the insecticide.

By completely filling the pipes in the evening, sufficient kerosene may be supplied to the perch members to last the entire night, and it is therefore unnecessary that the valve 11 be left open. It is also desirable that all pipes be on a level after leaving valve 11 as will be noted in the drawings.

It is obvious that those skilled in the art may vary the details of construction as well as the arrangement of parts without departing from the spirit of the invention, and therefore it is not wished to be limited to the above disclosure except as may be required by the claims.

What is claimed is:

1. A sanitary perch for fowls comprising a tubular member for holding an insecticide, said member being provided with perforations; an absorbent strip secured to said tubular member over said perforations, adapted to receive said insecticide therefrom and distribute it over the surface of said tubular member; and a foot-rest member of a width greater than said absorbent strip also secured to said tubular member.

2. A sanitary perch for fowls comprising a tubular member for holding an insecticide, said member being provided with perforations; an arcuate foot-rest member secured to said tubular member with its edges overhanging the same; and a narrower absorbent strip member interposed between said other members, adapted to receive insecticide from said perforations and to distribute it over the surfaces of said tubular and foot-rest members.

3. In a device of the class described the combination with a perch comprising a grid of interconnected hollow perforated members adapted to receive an insecticide, arcuate foot-rest members secured to the tops of said hollow members intermediate their connections, and absorbent strip members of a width less than that of said foot-rest members interposed between said hollow and foot-rest members, and adapted to receive said insecticide from said perforations and to distribute the same over the surfaces of said hollow and foot-rest members, of means for supplying said insecticide to said hollow members; and means for controlling said supply means.

In testimony whereof, I affix my signature.

DANIEL J. REEN.